United States Patent
Prasad et al.

(10) Patent No.: US 7,213,178 B1
(45) Date of Patent: May 1, 2007

(54) METHOD AND SYSTEM FOR TRANSPORTING FAULTS ACROSS A NETWORK

(75) Inventors: Sharat Prasad, San Jose, CA (US); Shankar Venkataraman, Campbell, CA (US)

(73) Assignee: Cisco Technology, Inc., San Jose, CA (US)

(*) Notice: Subject to any disclaimer, the term of this patent is extended or adjusted under 35 U.S.C. 154(b) by 556 days.

(21) Appl. No.: 10/449,260

(22) Filed: May 30, 2003

(51) Int. Cl.
*G06F 11/00* (2006.01)
(52) U.S. Cl. ........................ 714/43; 709/223
(58) Field of Classification Search ............. 714/43; 709/223
See application file for complete search history.

(56) References Cited

U.S. PATENT DOCUMENTS

| | | | |
|---|---|---|---|
| 5,724,149 A | | 3/1998 | Stallard et al. .......... 359/110 |
| 6,658,585 B1* | | 12/2003 | Levi ........................ 714/4 |
| 2003/0074413 A1* | | 4/2003 | Nielsen et al. .......... 709/206 |

OTHER PUBLICATIONS

Brand, Richard. "10 Gigabit Ethernet Connection With Wide Area Networks." Mar. 2002. Nortel Networks. pp. 2, 3. http://www.ethernetalliance.org/technology/white$_{13}$ papers/10gea_wan.pdf.*
IEEE Std 802.3ae™-2002 (Amendment to IEEE Std 802.3-2002). The Institute of Electrical and Electronics Engineers, Inc. Aug. 30, 2002. pp. 260, 261. http://standards.ieee.org/getieee802/download/802.3ae-2002.pdf.*
"Gigabit Ethernet" "Tunnel" "Tunneling" Microsoft Computer Dictionary (fifth edition). Copyright 2002. Mirosoft Press.*
10 Gigabit Ethernet Alliance, "An Introduction to the Ethernet Physical Layer as Used in Resilient Packet Ring System", Version 9.0 Apr. 2002.

* cited by examiner

*Primary Examiner*—Robert Beausoliel
*Assistant Examiner*—Matthew Urick
(74) *Attorney, Agent, or Firm*—Cindy Kaplan

(57) ABSTRACT

A method for transmitting faults across networks operating with different protocols is disclosed. The method includes identifying a fault at a local node, mapping a fault indication bit into a carrier packet, and transmitting the fault indication over a network. The method further includes receiving an indication that the fault was received at a remote node.

18 Claims, 3 Drawing Sheets

METHOD AND SYSTEM FOR TRANSPORTING FAULTS ACROSS A NETWORK

BACKGROUND OF THE INVENTION

The present invention relates generally to digital communication networks, and more specifically, to a method and system for transporting local and remote faults across different types of networks operating with different types of protocols.

Ethernet has developed into one of the most widely deployed network technologies. Data rates have increased from 10 Mbps to Gigabit speeds. The IEEE 802.3ae standard covers 10 Gigabit Ethernet and has brought Ethernet into another generation of applications. The Gigabit Ethernet protocol (as set forth in IEEE 802.3ae) includes the following sublayers: reconciliation sublayer (RS) and 10 Gbps Media Independent Interface (XGMII), XGMII Extender Sublayer and 10 Gbps Attachment Unit Interface (XAUI), PHY (physical), and Medium Dependent Interface (MDI). GMII provides two status signals: one indicates presence of the carrier, and the other indicates the absence of collision. The RS maps these signals to physical layer signaling (PLS) which is understood by the MAC (media access control) layer. The PHY sublayer includes the physical coding sublayer (PCS), an optional WAN interface, physical medium attachment (PMA) sublayer, and the physical medium dependent (PMD) sublayer. PCS is the GMII sublayer which provides a uniform interface to the RS for all physical media. The PCS sublayer generates carrier sense and collision detect indications.

Link fault signaling operates between the reconciliation sublayer in a local network element and the reconciliation sublayer in a remote network element. 10Base-R physical coding sublayer (PCS) is capable of detecting faults in a receive datapath that render a link unreliable for communication. These detected faults are then sent by a 10Base-R PCS receiver to the RS receiver. The RS transmitting signals are sent to the RS in the remote network element through the PCS in the transmit datapath with this fault indication.

The above description is a generic bi-directional fault communication mechanism described in 802.3ae. This method for transporting faults, however, cannot be directly used if faults are being transported across networks which carry protocols other than 10 GE between the local RS and the remote RS.

There is therefore, a need for a method for transporting local faults and remote faults across networks using different protocols.

SUMMARY OF THE INVENTION

A method for transmitting faults across networks operating with different protocols is disclosed. The method generally comprises identifying a fault at a local node, mapping a fault indication bit into a carrier packet, and transmitting the fault indication over a network. The method further includes receiving an indication that the fault was received at a remote node.

A computer program product for transmitting faults across networks operating with different protocols generally comprises code that identifies a fault at a local node, maps a fault indication bit into a carrier packet, and transmits the fault indication over a network. The product further includes code that receives an indication that the fault was received at a remote node and a computer-readable storage medium for storing the codes.

In another aspect of the invention a method for translating faults within a network carrying a protocol different than Gigabit Ethernet between a local node and a remote node operating within a Gigabit Ethernet network is provided. The method generally comprises identifying a fault at a node within the network, mapping a fault indication bit into a carrier packet, transmitting the fault indication within the network, and switching to a failover position.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

Figure 1:
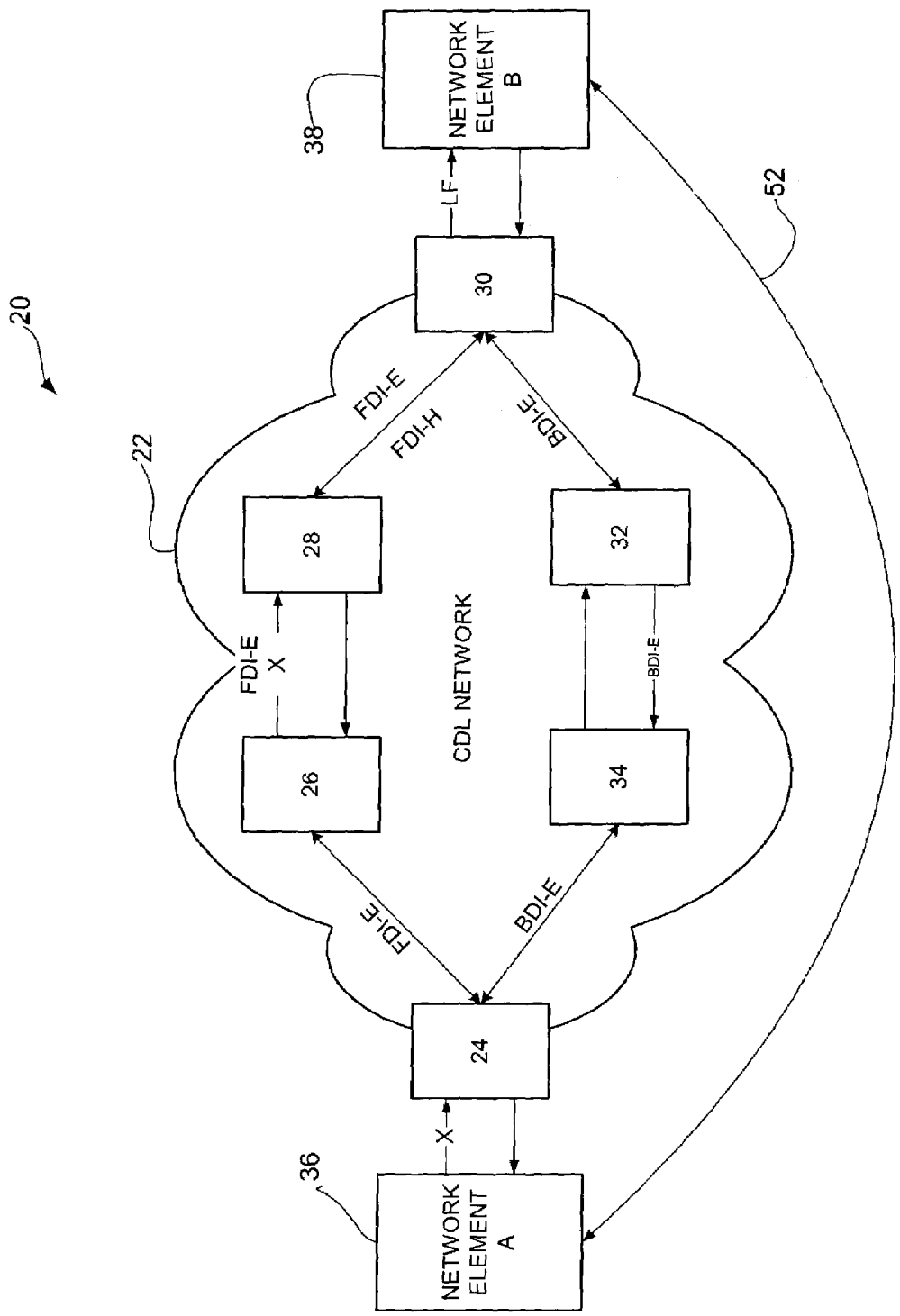
FIG. 1 is a schematic illustrating an exemplary network over which faults may be transported utilizing the present invention.

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The present invention operates in the context of a data communication network including multiple network elements. The network may be a packet based optical network that uses Ethernet data layer at speeds of 10 Gbps (or above or below 10 Gbps), both over high speed point-to-point circuits (i.e., dark fiber) and over WDM. However, it is to be understood that the system may be used with media types different than those described herein, without departing from the scope of the invention. A network element may be, for example, a terminal multiplexer, an add-drop multiplexer (ADM), an optical crossconnect (OXC), a signal regenerator, router, switch, or other optical node interface. The invention described herein may be implemented in dedicated hardware, microcode, or software.

The method and system described herein provide mapping for transporting local fault sequence ordered sets (LF SOS) and remote fault sequence ordered sets (RF SOS). In one embodiment, a method for translating and transporting local faults and remote faults defined by IEEE 802.3ae across different types of networks operating with different types of protocols is provided.

As discussed above, generic bi-directional fault communication mechanisms described in IEEE 802.3ae cannot be directly implemented if there are networks which carry protocols other than 10 GE between a local node and remote node. For example, in a long haul network that uses different protocols such as Efficient Framing Procedure (EFP) (as described in U.S. patent application Ser. No. 10/365,061, filed Feb. 12, 2003, which is incorporated herein by reference in its entirety), the LF SOS or RF SOS cannot be transported across the network, since they are defined only for 10 GE links.

As described in detail below, for links carrying, for example, smaller bandwidth and a different protocol between the encoding of local faults and remote faults, faults can be transported by mapping bits into a carrier packet which carries the fault indication in the header. In CDL protocol, for example, the carrier packet is the CDL Idle packet. (See, U.S. patent application Ser. No. 09/668,253, filed Sep. 21, 2000, which is incorporated herein by reference in its entirety). In EFP protocol, the carrier frame is the EFP CDL idle frame. (See, U.S. patent application Ser. No. 10/365,061, referenced above). For each new protocol and network, the faults can similarly be translated at the edge between the 10 GE network and the network having a different protocol. The same mapping mechanism can be extended to 1 GE and protocols such as Fibre Channel, ESCON, and others.

The following provides a brief description of CDL and EFP and the frames and fields which may be used to implement the present invention in networks carrying CDL or EFP.

CDL is a wrapper around the link layer packet. The CDL wrapper comprises a self-contained 7 byte CDL header that is prepended to standard Ethernet packets (e.g., IEEE 802.3) by replacing a preamble of the Ethernet packet. When applied to a standard Ethernet frame (IEEE 802.3), the CDL wrapper substitutes the SFD byte and the preceding six preamble bytes. The Ethernet frame is located after the CDL header, which replaces bytes in the standard Ethernet preamble. The CDL Header is described in U.S. patent application Ser. No. 09/668,253, entitled Method and System for Providing Operations, Administration, and Maintenance Capabilities in Packet Over Optics Networks, referenced above. CDL Ethernet employs the same PMA and PCS layers as Ethernet for signal rates of 100 Mbps, 1000 Mbps, and 10 Gbps. It is to be understood that although the invention is described herein using an Ethernet packet, other types of packets having a preamble may also be used. Thus, the term "Ethernet packet" or "Ethernet frame" as used herein includes packets or frames formatted according to standards other than IEEE 802.3.

The fields preferably included in the CDL header are:

Byte [1]: Packet type and OAM information

Byte [2]: Message channel

Byte [3–6]: Application specific information

Byte [7]: Header cyclic redundancy check (CRC)

The OAM field carries packet type information, error flags, and an automatic protection switching (APS) subchannel. OAM includes, for example, the following fields:

PT: Packet Type Field

AF: APS Framing

EB: End-to-end Backward Defect Indication (BDI-E)

EF: End-to-end Forward Defect Indication (FDI-E)

HB: Hop-by-hop Backward Defect Indication (BDI-H)

HF: Hop-by-hop Forward Defect Indication (FDI-H)

Automatic protection switching (APS) provides the capability of a transmission system to detect a failure on a working facility and to switch to a standby facility to recover the traffic, thus, improving overall system availability. The type field identifies whether or not the data and CRC fields are present.

The message channel provides a communication mechanism between network elements. Messages are hop-by-hop and may be forwarded or routed according to established routing protocols. The message channel allows management communication over the same physical facilities as the user data but without taking any bandwidth from the user data.

The application specific (AS) field carries information between end nodes that is forwarded along an optical path. The application specific field may include a subinterface identifier to assist in multiplexing packet streams. The application specific field may also be used to support applications other than multiplexing. For example, the application specific field may be used to facilitate multi-protocol label switched routing. The header CRC is employed for header error protection and covers the CDL header. The CRC is preferably computed over the entire value of the CDL header, including the AS field. The CRC header is preferably recomputed whenever any of the fields in the header are changed and passed transparently whenever the fields of the header do not change.

EFP packet types include EFP Ethernet packet, EFP CDL idle, and EFP idle. The EFP CDL idle is the mapping of a CDL idle packet coming from the client interface that has to be propagated to the far end client. The EFP CDL idle includes the length, length CRC, and CDL header fields. EFP CDL is used for fault propagation purposes. The EFP idle is used to fill the bandwidth when there is nothing to transmit. The EFP idle frame is provided as a filler frame, since one of the requirements for mapping EFP frames into octet synchronous paths is for the capacity of such paths to be not less than the capacity required by the Ethernet stream.

FIG. 1 illustrates an exemplary network 20 in which the method and system of the present invention may be used. The network may be, for example, a 10 GE network. The network includes a converged data link (CDL) network 22 having a plurality of CDL compatible network elements 24, 26, 28, 30, 32, 34. The CDL network is connected to two network elements A 36 and B 38, which are not configured for CDL operation. CDL idle packets (discussed below) originate and terminate at the edge of the CDL network. All non-CDL packets receive a CDL header (described below) while crossing the CDL network. It is to be understood that the network 20 shown is only one example and that other types of networks having different types of configurations and elements may be used without departing from the scope of the invention. For example, the CDL network 22 may be a long haul network using EFP or a network using any other protocol.

Figure 2:
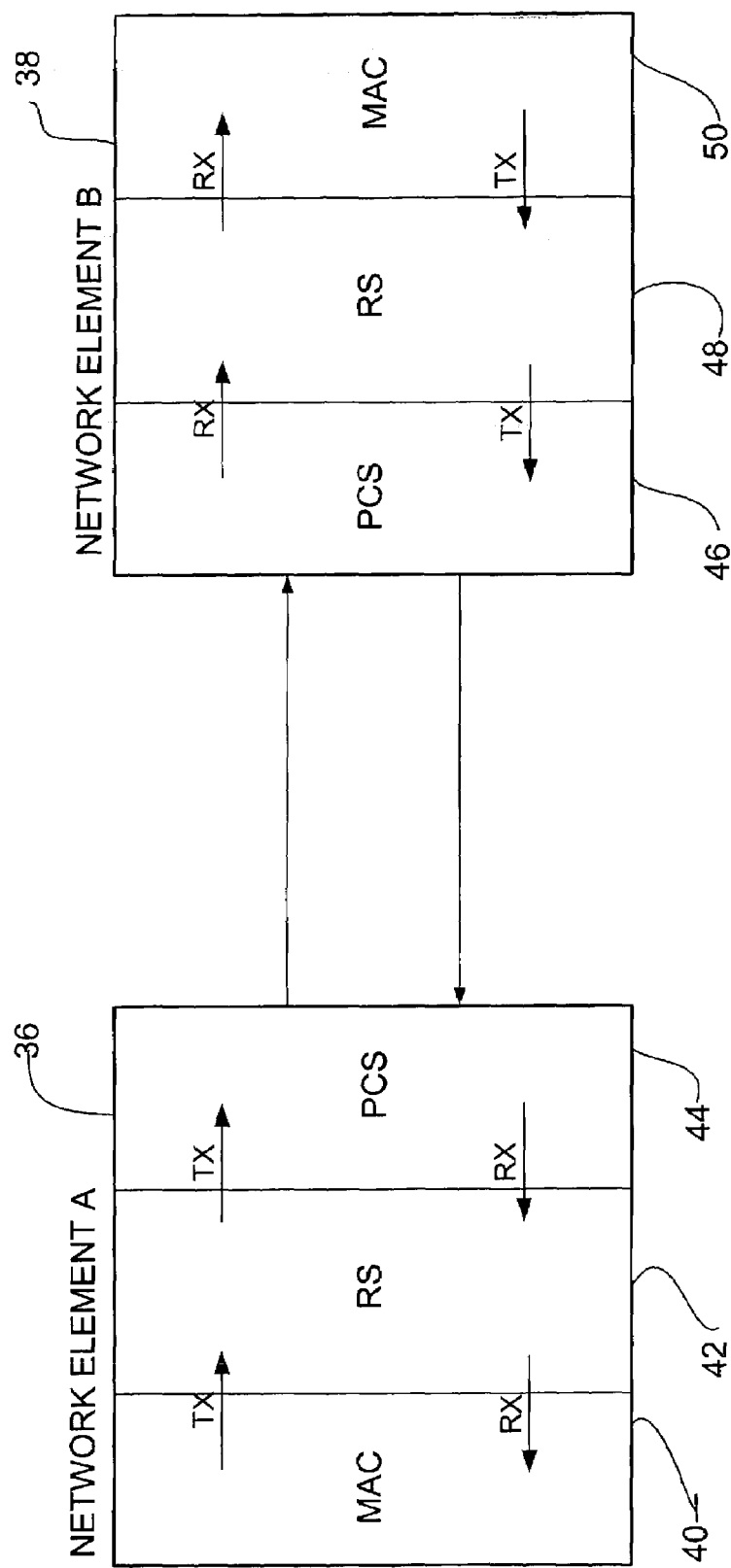
FIG. 2 is a schematic illustrating details of two network elements of the network shown in FIG. 1.

FIG. 2 illustrates additional detail of network elements A 36 and B 38. At network element A 36 faults are transmitted from a MAC sublayer 40, through an RS sublayer 42 to a PCS sublayer 44 and received at network element B 38 at the PCS layer 46 and transmitted through the RS sublayer 48 to the MAC sublayer 50. Faults are similarly transmitted from network element B 38 to network element A 36 through the PCS sublayer. Local and remote fault SOSs originate and terminate at the RS sublayer. The sublayers are preferably configured as defined in IEEE 802.3ae, and described above.

In order to transport a local fault SOS from network element A 36 to network element B 38 and back from network element B to network element A, a Forward Defect Indication (FDI) bit is used. The FDI can originate at the end of a CDL network (in which case it is an FDI-E), or it can originate between hops in a CDL network (in which case it is an FDI-H). A local fault is converted to FDI-H or FDI-E based on the point of origin of a local fault. A remote fault is converted to BDI-E at the edge of a CDL network. The FDI bit is transported in the header carried by the frame or packet defined by the protocol used in the different networks between network element A 36 and network element B 38 (e.g., CDL network of FIG. 1). For example, if there is a failure in the link between network element A 36 and edge element 24 (indicated by an X through the link in FIG. 1), an FDI-E bit is sent through elements 26, 28, and 30 and transmitted to network element B 38 as a local fault. Once network element A receives a reply back from network element B 38 (in the form of RF to BDI-E to RF, through network elements 30, 32, 34, 24), the two nodes can switch to a failover position in which they communicate through alternate path 52.

When network element 30 receives a FDI-H, it terminates the FDI-H and performs a switch-over within the CDL network. When network element 30 receives FDI-E, an FDI-E to LF SOS is performed by network element 30 and switch-over takes place outside the CDL network.

In order to transport a remote fault SOS from network element A 36 to network element B 38 and from network element B back to network element A, a Backward Defect Indication (BDI) bit is used, as described above.

In the case of 10 Gbps, received LF and RF SOSs are replaced with Idle characters. If the string of LF or RF SOSs is long enough, some of the idle characters in the corresponding string of idle characters are preferably replaced by CDL idle packets (described above). Two mechanisms are available for transport of local faults. In the first mechanism, after a local fault SOS is recognized and before the local fault clears (IEEE 802.3ae), an edge port generates CDL idle packets carrying a special value in the application specific field. The port at the other edge of the CDL network maintains a timer that is reinitialized whenever a CDL packet with appropriate bits set (e.g., FDI-E or FDI-H bits) is received. If the counter times out, local fault SOSs are generated at the other edge of CDL network. In the second mechanism, a pre-configured value is used in the default indication fields of idle packets which are sent and represent an edge local fault. If a node receives this idle packet, it begins transmitting local fault SOSs. For remote fault propagation, only the second mechanism is used. The mechanisms and timer are further described below.

The timer (e.g., down counting millisecond timer) is provided at network element 30. For transporting local faults, the timer continues to reload to a fixed value every time it receives a CDL idle/CDL Ethernet packet with DAS_EDGE (4 bytes in the CDL application specific header field) in it. If a local fault occurs near network element 24 (as shown by "X" in FIG. 1), network element 24 can either send an FDI-E (using the first mechanism described above) or change the DAS-EDGE in the CDL packets it generates to DAS_DEFAULT (using the second mechanism described above). In the first mechanism, the millisecond timer times out as it stops receiving DAS_EDGE in the CDL packets and instead receives DAS_DEFAULT. This leads to generation of local fault by network element 30. For example, a sudden stop of flow of CDL packets in the network due to an unknown failure automatically triggers local fault generation at network element 30 as the timer times out within a few milliseconds as soon as it senses the absence of CDL headers. In the second mechanism, network element 30 receives a FDI-E and generates a local fault. The choice of the first or second mechanism is preferably programmable at network element 24, with network element 30 responding with a local fault for a failure due to either of the mechanisms.

The following provides an example for transmitting faults within a network utilizing EFP. Defect Handling is provided by the CDL header. A Client Signal Fail condition (e.g., loss of signal) is handled by the EFP source generating a stream of all EFP Idle frames and setting the FDI-E bit in the CDL header. A 10 Gbps EFP sink, upon receiving EFP Idle frame with BDI-E bit set or an OTU2-AIS (Alarm Indication Signal) defined by the ITU G.709 standard, begins to forward RF SOSs. The EFP source stops forwarding EFP Idle frames with BDI-E set when the RF condition clears (as specified in IEEE 802.3ae Section 46.3.2). The EFP sink stops forwarding RF SOSs if an EFP Idle frame with BDI-E bit clear or an EFP Client Data frame is received or OTU2-AIS clears (as specified in ITU-T G.709). In addition, an LF and RF indication are propagated to the far end using the same CDL FDI/BDI propagation mechanism.

The system is also configured for translating faults which originate in the middle of the network 22. For example, if a failure occurs in the link between node 26 and node 28 (indicated with an X through the link in FIG. 1), an FDI-H bit is transmitted within the CDL network 22 and the network elements switch to a failover position and route network traffic through nodes 32 and 34. The FDI-H bit does not leave the CDL network 22.

Figure 3:
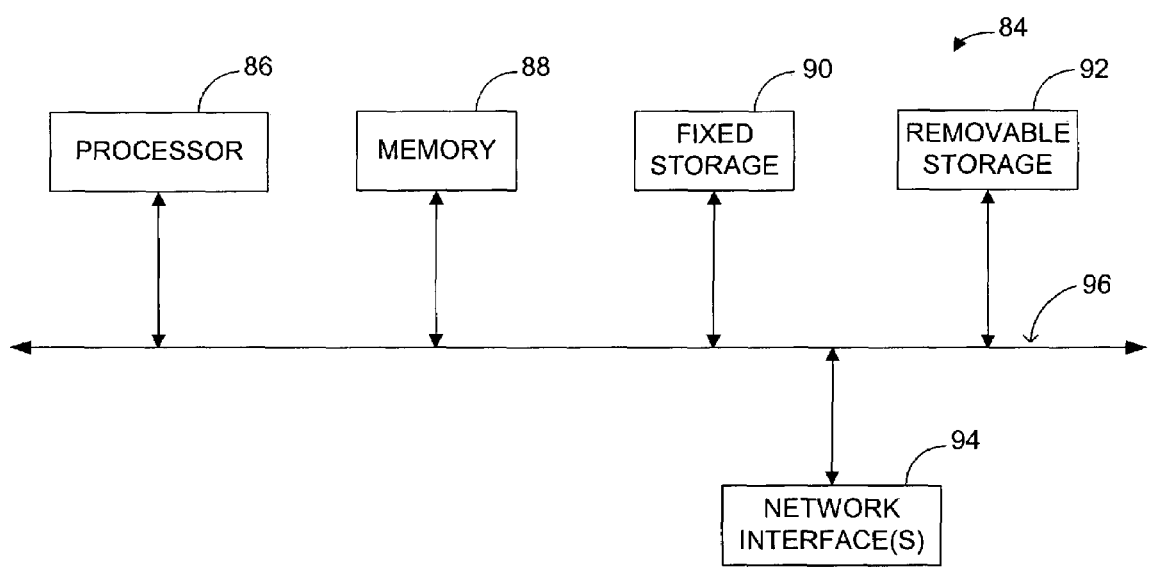
FIG. 3 is a system block diagram of a computer system that can be utilized to execute software of an embodiment of the present invention.

As noted above, the invention described herein may be implemented in dedicated hardware, microcode, or software. FIG. 3 shows a system block diagram of computer system 84 that may be used as a router or host or used to execute software of an embodiment of the invention. The computer system 84 includes memory 88 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Additionally, a data signal embodied in a carrier wave (e.g., in a network including the Internet) may be the computer readable storage medium. Computer system 84 further includes subsystems such as a central processor 86, fixed storage 90 (e.g., hard drive), removable storage 92 (e.g., CD-ROM drive), and one or more network interfaces 94. Other computer systems suitable for use with the invention may include additional or fewer subsystems. For example, computer system 84 may include more than one processor 86 (i.e., a multi-processor system) or a cache memory.

The system bus architecture of computer system 84 is represented by arrows 96 in FIG. 3. However, these arrows are only illustrative of one possible interconnection scheme serving to link the subsystems. For example, a local bus may be utilized to connect the central processor 86 to the system memory 88. Computer system 84 shown in FIG. 3 is only one example of a computer system suitable for use with the invention. Other computer architectures having different configurations of subsystems may also be utilized. Communication between computers within the network is made possible with the use of communication protocols, which govern how computers exchange information over a network.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for transmitting faults across networks operating with different protocols, the method comprising:
    identifying a fault at a local node operating according to a first protocol;
    mapping a fault indication bit configured for said first protocol into a carrier packet configured for a second protocol different from said first protocol;
    transmitting the fault indication over a network operating according to said second protocol; and
    receiving an indication that the fault was received at a remote node;
    wherein said second protocol is converged data link protocol.

2. The method of claim 1 wherein the carrier packet is an idle packet.

3. The method of claim 1 wherein mapping a fault indication bit into a carrier packet comprises inserting the fault indication into a header of the carrier packet.

4. The method of claim 1 further comprising sending said carrier packet to a PCS coding block.

5. The method of claim 1 wherein transmitting the fault indication comprises generating a fault indication at a reconciliation sublayer of the local node.

6. The method of claim 1 wherein mapping a fault indication bit into a carrier packet comprises replacing sequence ordered sets with idle characters.

7. A method for transmitting faults across networks operating with different protocols, the method comprising:
    identifying a fault at a local node operating according to a first protocol;
    mapping a fault indication bit configured for said first protocol into a carrier packet configured for a second protocol different from said first protocol;
    transmitting the fault indication over a network operating according to said second protocol; and
    receiving an indication that the fault was received at a remote node;
    wherein mapping a fault indication bit into a carrier packet comprises replacing sequence ordered sets with idle characters and at least some of the idle characters are replaced with converged data link idle packets.

8. The method of claim 7 wherein the idle packet is generated at an edge port.

9. The method of claim 1 wherein said first protocol is 10 Gigabit Ethernet protocol.

10. A computer program product for transmitting faults across networks operating with different protocols, the product comprising:
    code that identifies a fault at a local node operating according to a first protocol;
    code that maps a fault indication bit configured for said first protocol into a carrier packet configured for a second protocol different from said first protocol;
    code that transmits the fault indication over a network operating according to said second protocol;
    code that receives an indication that the fault was received at a remote node; and
    a computer-readable storage medium for storing the codes;
    wherein said second protocol is converged data link protocol.

11. A method for translating faults within a network carrying a converged data link protocol between a local node and a remote node operating within a Gigabit Ethernet network, the method comprising:
    identifying a fault at a node within the network;
    mapping a fault indication bit configured for Gigabit Ethernet into a carrier packet configured for said converged data link protocol;
    transmitting the fault indication within the network; and
    switching to a failover position.

12. The method of claim 11 wherein mapping a fault indication bit into a carrier packet comprises inserting the fault indication into a header of the carrier packet.

13. The method of claim 11 further comprising sending said carrier packet to a PCS coding block.

14. Apparatus for transmitting faults across networks operating with different protocols, comprising:
    a processor; and
    a memory that stores instructions for execution by said processor, said instructions comprising:
        code that identifies a fault at a local node operating according to a first protocol;
        code that maps a fault indication bit configured for said first protocol into a carrier packet configured for a second protocol different from said first protocol;
        code that transmits the fault indication over a network operating according to said second protocol; and
        code that receives an indication that the fault was received at a remote nodes
    wherein said second protocol is converged data link protocol.

15. The apparatus of claim 14 wherein the carrier packet is an idle packet.

16. The apparatus of claim 14 wherein code that maps said fault indication bit into said carrier packet comprises code that inserts the fault indication into a header of said carrier packet.

17. The apparatus of claim 14 wherein code that maps said fault indication bit into said carrier packet comprises code that replaces sequence ordered sets with idle character sets.

18. Apparatus for translating faults with a network carrying a converged data link protocol between a local node and a remote node operating within a Gigabit Ethernet network, the apparatus comprising:
    means for identifying a fault at a node within the network;
    means for mapping a fault indication bit configured for Gigabit Ethernet into a carrier packet configured for said converged data link protocol;
    means for transmitting the fault indication within the network; and
    means for switching to a failover position.

* * * * *